March 21, 1939. L. J. KEPLER 2,151,117
TOOL LIFT FOR CULTIVATORS
Filed April 8, 1937 2 Sheets-Sheet 1

INVENTOR
Lionel J. Kepler
BY
Bohleber + Ledbetter
ATTORNEYS

March 21, 1939.  L. J. KEPLER  2,151,117
TOOL LIFT FOR CULTIVATORS
Filed April 8, 1937  2 Sheets-Sheet 2

INVENTOR
Lionel J. Kepler
BY
Bohleber + Ledbetter
ATTORNEYS

Patented Mar. 21, 1939

2,151,117

UNITED STATES PATENT OFFICE 2,151,117

TOOL LIFT FOR CULTIVATORS

Lionel J. Kepler, Dayton, Ohio

Application April 8, 1937, Serial No. 135,662

10 Claims. (Cl. 97—43)

This invention relates to tool or shovel lifts for cultivators and particularly those employing a trailer wheel for supporting the rear end of the cultivator chassis, whether or not cultivating tools supported thereby are disposed in digging or operative position, or disposed in non-digging or inoperative position, as these terms will be more specifically described hereinafter.

An important object of my invention is to construct a device of the class described in which a trailer wheel, used in combination with a cultivator having tools attached thereto, can be lowered with respect to said tools by merely raising the handles of the cultivator sufficiently to lift the tools out of the ground and dispose the same in inoperative position, and enable the trailer wheel to move with respect to the tools under the influence of gravity and thereafter automatically become locked in the position to which said wheel is so moved; and whereby said tools are automatically restored under the influence of gravity to operative position when said wheel mechanism is thereafter unlocked.

A further object of my invention is to construct, in combination with an automatic locking mechanism of the class described, means for easily and conveniently tripping or releasing said locking mechanism to restore, under the influence of gravity, the cultivator tools to operative position.

Figure 1:
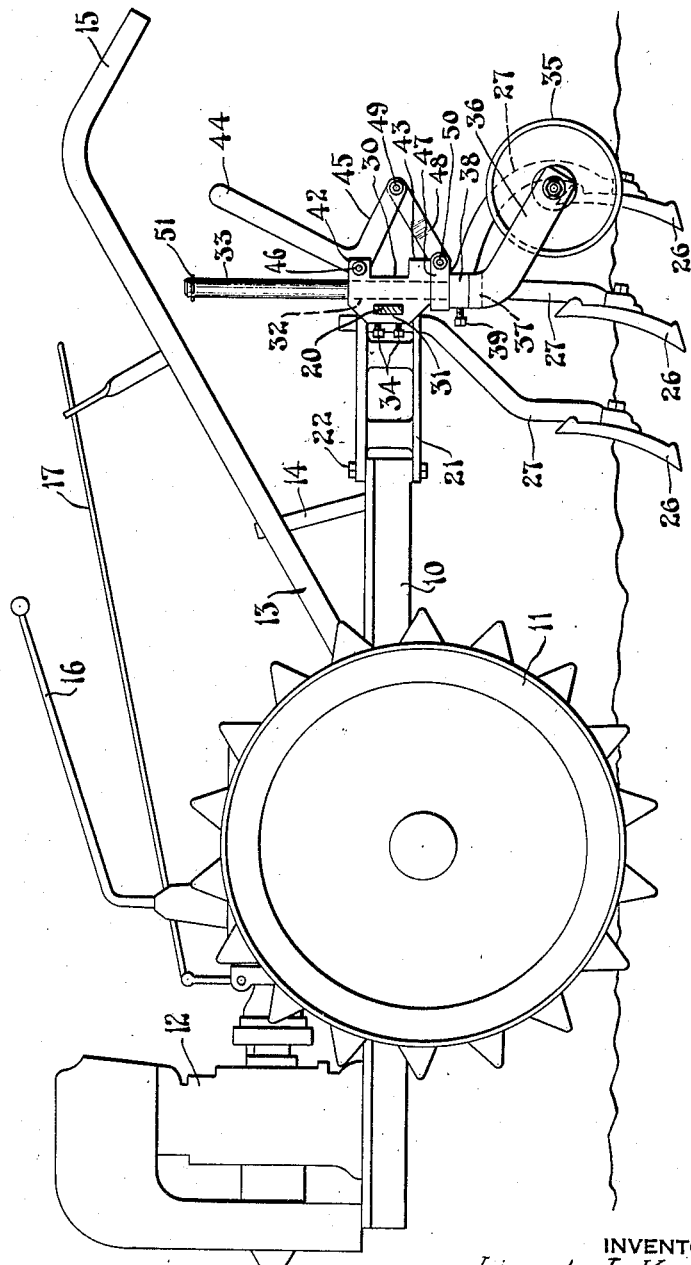

Other objects and advantages of my device will readily be understood or particularly referred to in the following detailed description thereof written in connection with the accompanying drawings, in which Figure 1 shows a somewhat diagrammatic elevational view of a cultivator comprising a supporting lift wheel as the same will appear when the cultivator and tools used in combination therewith are disposed in digging or operative position.

Figure 2:
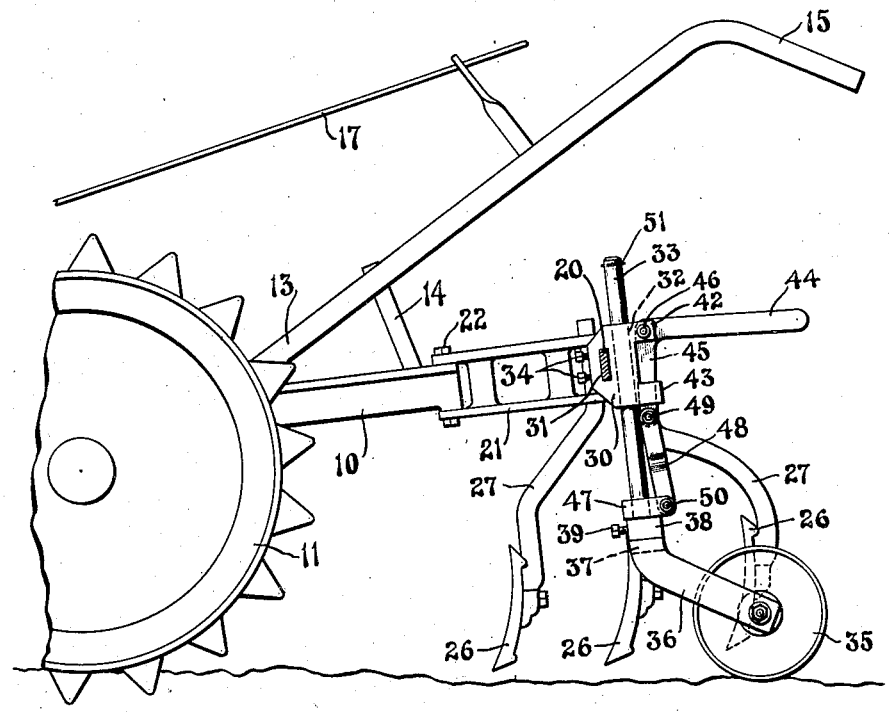

Figure 2 is an elevational view of the rear end of the device shown in Figure 1, illustrating among other things the relationship between the tools and lift wheel after the handles of the cultivator have been elevated and the lift wheel permitted to move with respect to the tools by gravity and become locked in the position to which said wheel is so moved; and thereafter support the tools in inoperative position.

Figure 3:
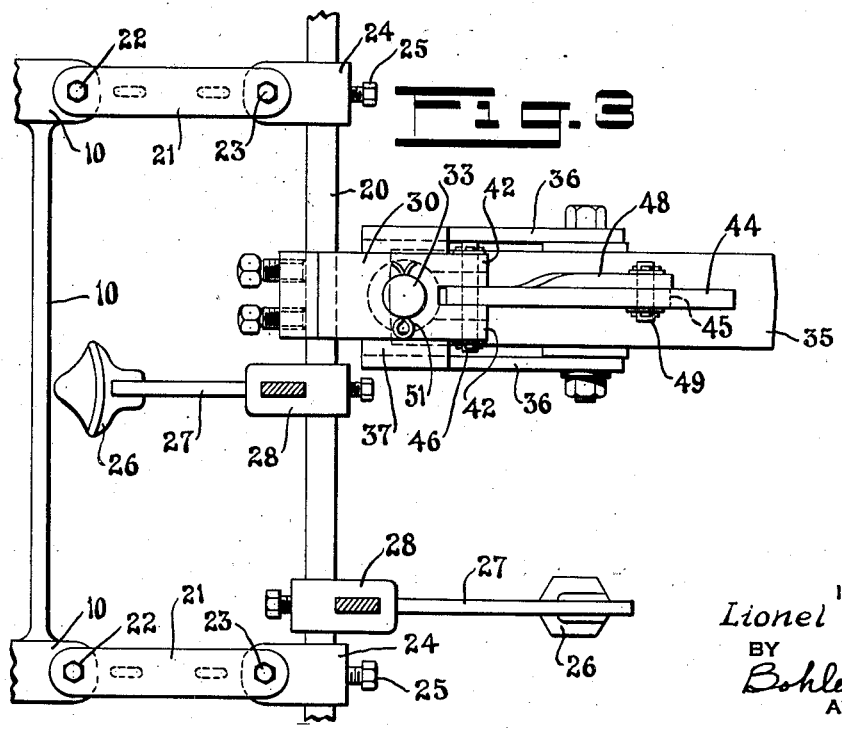

Figure 3 shows an enlarged fragmentary plan view of the manner of mounting the lift wheel and its operating mechanism on the rear end of a cultivator of the class described and also illustrates the same as it would appear with the parts in the position shown in Figure 1.

Referring now to the drawings wherein a preferred embodiment of my invention is illustrated, it will be seen that the cultivator comprises a chassis frame 10 mounted upon a pair of wheels 11 driven in any suitable way, not shown, by any suitable source of motive power 12, such as an internal combustion engine. A pair of members 13 (only one of which is shown) are secured by means including a brace 14, to the chassis in any suitable way proximate the point at which the chassis is supported by the wheels 11. These members 13 extend rearwardly and upwardly from the point of attachment to the chassis to form handles 15 similar to the handles of a plow.

In the form of the device here shown, means indicated at 16 and 17 are provided and mounted proximate the handles 15 for controlling the engine 12. Inasmuch as this engine, its connection to the driving wheels 11, and its control mechanism, per se, form no part of my present invention, further description thereof appears to be unnecessary.

A tool bar 20 is mounted at the rear of the chassis 10 by a pair of parallel links or hitch castings 21 which permit the bar 20 to move from side to side with reference to the chassis. Each of the links 21 have one end pivoted to the chassis as at 22, and the other end pivoted at 23 to a block 24 provided with a suitable opening through which the tool bar 20 is disposed. A set screw 25 is provided in the block 24 by means of which the block is secured to the tool bar 20 at any desired position throughout the length thereof.

Tools 26, carried on shanks 27, are also mounted on the tool bar 20 by means of any suitable tool clamp such as that illustrated in Figure 3, at 28. The shanks 27 may be formed in various shapes so as to position the tools 26 either forward of, behind, or immediately below the tool bar 20, as desired. Inasmuch as the manner of mounting tools of this type is more or less commonplace, it appears that further description thereof is unnecessary. It will be understood, however, that instead of carrying shovels and shanks on the tool bar 20, as above described, my invention contemplates that discs or other cultivating tools may be carried thereby and employed in combination with the lift wheel mechanism to be hereinafter described.

In the embodiment of my invention here shown, I mount, by means of a carrier block 30 disposed between the hitch castings 21, a lift wheel mechanism. The carrier block 30 is provided with one opening 31 in which the tool bar 20 is disposed similar to the manner above described in connection with the block 24; and a second opening 32, spaced from and at right angles to the opening 31, adapted to slidably receive a bar 33. Set screws 34 are provided for securing the block 30 to the bar 20 in any suitable position.

A lift wheel 35, carried by the arms 36 of a U-shaped or bifurcated fixture having a cross plate 37, is rigidly fixed to the lower end of the bar 33. A set collar 38 is slidably mounted on the bar 33 and provided with a set screw 39 by which the same may be fixed in any one of various positions along the bar 33, for reasons to be hereinafter described.

At the top and bottom of the carrier block 30, and at the side thereof remote from the opening 31, is formed two pairs of lugs, numbered 42 and 43 respectively. A bell crank comprising a handle 44 and link 45 is pivotally mounted between the lugs 42 on a pin 46 passing through the lugs and a point in the bell crank common to both the handle 44 and link 45. A collar 47, slidably mounted on the bar 33, is connected to the end of the link 45 remote from the pin 46, by means of a link 48 and pivot pins 49 and 50, passing respectively through the ends of link 48. A cotter pin 51 is disposed in the upper end of the bar 33 to prevent the same from inadvertently being pulled out of the block 30.

Reference to Figure 2 will reveal that when the link 45 is disposed in vertical position as shown, it is adapted to lie between the lugs 43 on the block 30 and be restrained thereby against substantial lateral movement. It will also be observed that when the links 45—48 occupy the position shown in Figure 2, pivot pins 46, 49 and 50 are not in alignment, that is, pivots 46 and 50 are disposed further to one side of the bar 33 than is the pivot 49.

I shall now describe the operation of my invention. Assuming that the operator desires to move the shovels 26 from operative position as shown in Figure 1 to inoperative position as shown in Figure 2, he merely has to lift the handles 15 to elevate the rear end of the chassis 10, including the tool bar 20, by rocking the former about the drive wheels 11 as a fulcrum. As the tool bar 20 is elevated the block 30 slides upwardly on the bar 33; and since the wheel 35 and its associated mechanism are at least for a time retained by gravity in contact with the ground, the links 45 and 48, and collar 47 will automatically assume the position shown in Figure 2 with the link 45 disposed between the lugs 43 on the carrier block 30 whereby the pivots 46, 49, 50 in combination with the bar 33 assume the toggle relationship shown in Figure 2. Obviously, the operator may lift the rear end of the cultivator far enough for the block 30 to contact the cotter pin 51 and thereafter lift the wheel 35 off the ground. However, as soon as the operator lowers the handles 15 or ceases to elevate the same, once the parts, above described, are disposed in the position shown in Figure 2, the rear end of the cultivator is supported by means of the lift wheel 35 and its associated mechanism. Figure 2 illustrates that this support for the tool bar, shovels, etc., comprises the block 30, link 45 with the lower end thereof in contact with the bar 33, link 48 and collar 47 to which the same is attached, collar 38, plate 37, arms 36 and wheel 35. To restore the parts to the position shown in Figure 1, it is merely necessary to trip or elevate the handle 44 sufficiently to move the pivot 49 to the right and break the toggle formed by the pivots 46, 49, 50 of Figure 2 whereupon the rear end of the cultivator will drop by gravity and again position the shovels on the ground in digging position.

Referring to Figure 2, it will be understood that the set collar 38 may be elevated and fixed in a position above the cross plate 37 to reduce the distance below the lift wheel to which the shovels will extend. Accordingly, the adjustment of the set collar to various positions along the bar 33 offers an extremely simple way of employing the lift wheel as a depth gauge for controlling the depth into the soil to which the shovels are adapted to dig. Heretofore, it has been the custom to move the shovel shanks 27 in and out of the tool clamps 28 to effect such an adjustment and while this shovel adjustment is still applicable to the present device, the movement of the set collar 38 is much more simple and just as effective for comparatively small adjustments in the digging depth of the shovels.

While I have illustrated my invention in combination with shovels, and described the same also in combination with discs, it will be understood that the device is suitable for lifting seeders, planters or other implements or tools clear of the ground when not in use, and that the automatic lift or carrier wheel function of the device above described is not necessarily limited to the structure here shown.

Various modifications will occur to those skilled in the art in the configuration, composition and disposition of the component elements going to make up my invention as a whole, as well as in the selective combination or application of the respective elements, and no limitation is intended by the phraseology of the foregoing description or illustrations in the accompanying drawings.

What is claimed is:

1. An agricultural implement having a frame portion movable upwardly and downwardly with respect to the ground comprising means mounting a tool on said frame for movement upwardly from operative to inoperative position, in combination with mechanism carried by said frame for supporting said tool in either operative or inoperative position with reference to the ground, said mechanism including a lift wheel slidably mounted on said frame, toggle means connected to said tool mounting means and lift wheel rendered operable under the influence of gravity to support the tool in inoperative position upon the elevation of said frame portion, and means for breaking said toggle whereupon said tool is restored to operative position under the influence of gravity.

2. A mechanism for an agricultural implement having a frame mounted on wheels disposed at one side of the center of gravity of said mechanism and tools carried thereby and disposed at the other side of said center of gravity, the frame being adapted to rock on said wheels as a fulcrum to locate the tools in either operative or inoperative position, comprising a lift wheel mechanism including a trailer wheel adapted to be mounted upon the frame proximate said tools and freely movable by gravity relative to the frame while said trailer wheel remains in contact with the ground and support said tools in either operative and inoperative position, said lift wheel mechanism comprising toggle means for automatically locking the same relative to the frame upon a predetermined upward movement thereof for supporting the tools in inoperative position; and means for releasing said locking means to permit the tools to assume, with respect to said trailer wheel, an operative position.

3. A mechanism for an agricultural implement having a frame mounted on wheels disposed at one side of the center of gravity of said mechanism and tools carried thereby and disposed at the other side of said center of gravity, the frame being adapted to rock on said wheels as a fulcrum to locate the tools in either operative or inoperative position, comprising a lift wheel mechanism including a trailer wheel adapted to be mounted upon the frame proximate said tools and freely movable by gravity relative to the frame while said trailer wheel remains in contact with the ground and support said tools in either operative and inoperative position, said lift wheel mechanism comprising toggle means for automatically locking the same relative to the frame upon a predetermined upward movement thereof for supporting the tools in inoperative position, means for releasing said locking means to permit the tools to assume, with respect to said trailer wheel, an operative position, and a setting mechanism for locating the trailer wheel in different positions with respect to said tools whereby said wheel is adapted to serve as a depth gauge.

4. A cultivator comprising in combination a tool bar, cultivator tools mounted on said bar, a bar carrying a lift wheel slidably mounted on said tool bar for supporting said tools in either of two positions with respect to the ground, a collar slidably mounted on said lift wheel bar, means above the lift wheel to limit the movement of said collar toward said wheel, a bell crank rotatably mounted on said tool bar, and a link connecting one arm of said bell crank to said collar, said arm, link and lift wheel bar forming extendible and retractable toggle means between said tool bar and lift wheel which when extended supports said tools in inoperative position, and when retracted supports the same in operative position.

5. An agricultural implement having a frame portion movable upwardly and downwardly with respect to the ground comprising means mounting a tool on said frame for movement upwardly from operative to inoperative position, in combination with a gravity actuated mechanism carried by said tool mounting means for supporting said tool in inoperative position, said mechanism including a slidably mounted rod, a lift wheel mounted thereon, and stop means movable with respect to said rod for setting the same in different tool supporting positions irrespective of whether said tool is in an operative or an inoperative position.

6. An attachment for agricultural implements having tools carried by means movable upwardly to withdraw said tools from operative position in the ground to inoperative position above the ground, comprising supporting means adapted to be mounted upon that portion of the implement which is movable upwardly, said means including a lift wheel slidably movable by gravity to an extended position with respect thereto in combination with toggle means for automatically locking in extended position the lift wheel against movement relative to the supporting means for supporting said tools in inoperative position.

7. An attachment for agricultural implements having tools carried by means movable upwardly to withdraw said tools from operative position in the ground to inoperative position above the ground, comprising means adapted to be mounted upon that portion of the implement which is movable upwardly, said means including a carrier block, and a lift wheel freely movable by gravity to an extended position with respect to said carrier block when said block is moved upwardly a predetermined distance, in combination with toggle means for automatically locking the lift wheel against movement from said extended position.

8. An attachment for agricultural implements having tools carried by means movable upwardly to withdraw said tools from operative position in the ground to inoperative position above the ground, comprising means adapted to be mounted upon that portion of the implement which is movable upwardly, said means including a carrier block, and a lift wheel freely movable by gravity to an extended position with respect to said carrier block when said block is moved upwardly a predetermined distance, in combination with toggle means for automatically locking the lift wheel against movement from said extended position, and means for releasing said toggle means.

9. A trailer wheel mechanism adapted for use with an agricultural implement having tools carried by a frame which is movable upwardly to withdraw said tools from operative position in the ground to inoperative position above the ground, comprising supporting means adapted to be mounted upon that portion of the frame which is movable upwardly, said means including a lift wheel slidably movable by gravity and adapted to remain in contact with the ground as the frame is moved upwardly, in combination with toggle means operable when the implement frame is moved upwardly a predetermined distance for automatically locking the lift wheel against movement relative to the supporting means for supporting tools in inoperative position.

10. An attachment for agricultural implements having tools carried by means movable upwardly to withdraw said tools from operative position in the ground to inoperative position above the ground, comprising means adapted to be mounted upon that portion of the implement which is movable upwardly, said means including a carrier block, and a lift wheel freely movable by gravity to an extended position with respect to said carrier block when said block is moved upwardly a predetermined distance, in combination with toggle means for automatically locking the lift wheel against movement from said extended position, and means on said mounting means for laterally supporting said toggle in locked position.

LIONEL J. KEPLER.